United States Patent
Liu

(10) Patent No.: US 7,578,231 B2
(45) Date of Patent: Aug. 25, 2009

(54) PLUNGER AND LID APPARATUS FOR A BEVERAGE PRESS AND A BEVERAGE PRESS HAVING SAME

(75) Inventor: Yiu Ching Liu, Wilsonville, OR (US)

(73) Assignee: Pacific Cornetta, Inc., Tualatin, OR (US)

( * ) Notice: Subject to any disclaimer, the term of this patent is extended or adjusted under 35 U.S.C. 154(b) by 573 days.

(21) Appl. No.: 11/080,083

(22) Filed: Mar. 14, 2005

(65) Prior Publication Data

US 2006/0021524 A1 Feb. 2, 2006

Related U.S. Application Data

(60) Provisional application No. 60/592,819, filed on Jul. 30, 2004.

(51) Int. Cl.
*A47J 31/20* (2006.01)
*A47J 31/40* (2006.01)

(52) U.S. Cl. .......................................... 99/297; 99/287

(58) Field of Classification Search ........... 99/297–315, 99/287

See application file for complete search history.

(56) References Cited

U.S. PATENT DOCUMENTS

| | | | | |
|---|---|---|---|---|
| 2,459,498 | A | * | 1/1949 | Cameron ...................... 99/287 |
| 5,618,570 | A | * | 4/1997 | Banks et al. ................. 426/435 |
| 5,887,510 | A | | 3/1999 | Porter |
| 5,943,949 | A | | 8/1999 | Sham et al. |
| 6,324,967 | B1 | * | 12/2001 | Robinson ...................... 99/297 |
| 6,422,133 | B1 | | 7/2002 | Brady |
| 7,093,531 | B2 | * | 8/2006 | Tardif ........................... 99/297 |

* cited by examiner

*Primary Examiner*—Sang Y Paik
(74) *Attorney, Agent, or Firm*—Steven J. Adamson

(57) ABSTRACT

A plunger device for use with a beverage press having a screen for filtering fines from an infused beverage. A flexible seal is provided that is compressible to function properly in different sized containers. The seal may be made of a material such as rubber or rubberized plastics or the like and may have a width that is greater than its thickness. Various seal embodiments including ascending, descending and non-circular embodiments are disclosed. Brew control and multiple access openings are also disclosed.

5 Claims, 4 Drawing Sheets

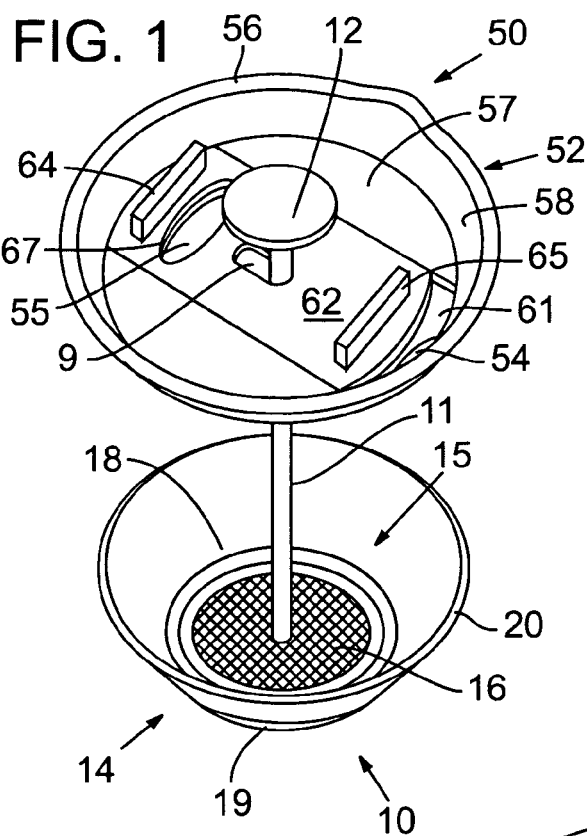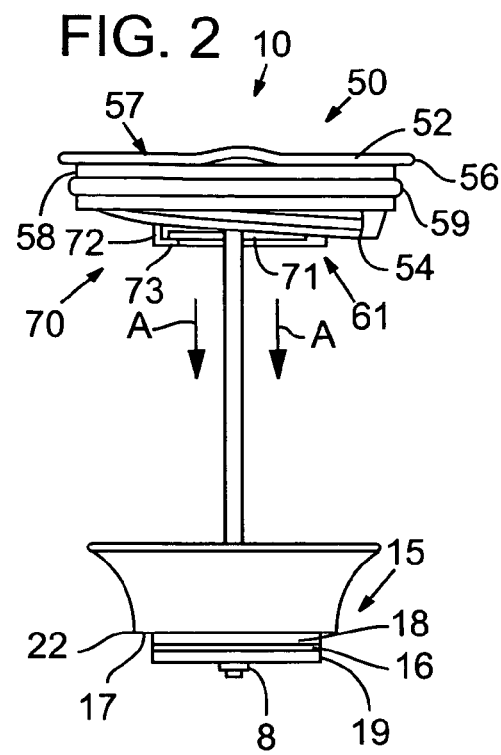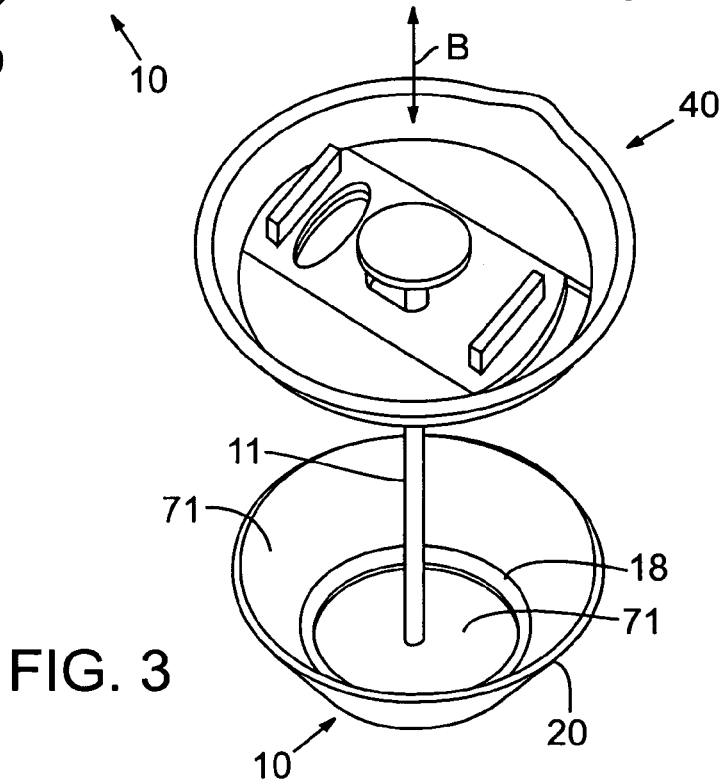

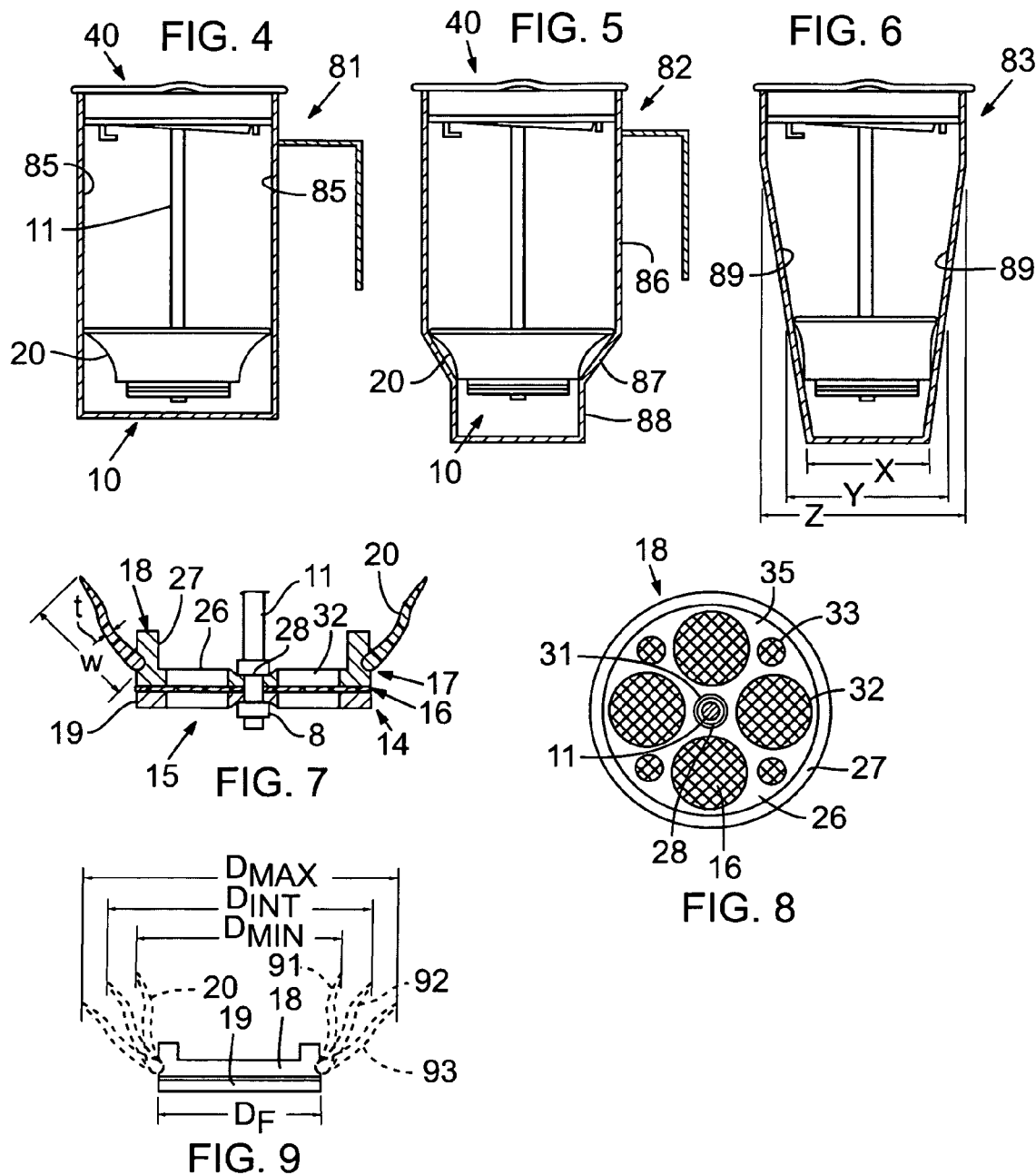

PLUNGER AND LID APPARATUS FOR A BEVERAGE PRESS AND A BEVERAGE PRESS HAVING SAME

CROSS-REFERENCE TO RELATED APPLICATION(S)

This application claims the benefit of U.S. Provisional Application No. 60/592,819, filed Jul. 30, 2004, and having the same title and inventor as above.

FIELD OF THE INVENTION

The present invention relates to beverage presses and more specifically to the plunger, strainer and/or seal arrangements for such presses.

BACKGROUND OF THE INVENTION

Coffee, tea and other types of beverage presses are known in the art. A typical beverage press may include some type of container or vessel and a complementary shaped plunger having a strainer formed on one end. The plunger shaft is typically provided through a removable lid and has an exterior-side knob or handle to assist a user in moving the plunger up and down.

In use, coffee grounds, tea leaves (in whole or part) or other beverage brewing materials (generally referred to herein as "fines") are placed in the vessel. A liquid, usually hot, but not necessarily, is then poured into the vessel and let brew or seep for a desired amount of time. After the brew period, the plunger is moved in the appropriate manner, usually pushed downward, to cause the strainer to separate the fines from the infused liquid. The infused liquid, now substantially free of fines, is ready for consumption.

Various beverage presses, such as "French presses," have been known since at least the 19$^{th}$ century. More recent trends in beverage presses include fabrication for portability and reducing size to accommodate single servings. While various beverage presses are known in the art, they are generally disadvantageous for one or more of the following reasons.

Presses typically include a seal that is moved up and down during use and conforms to the interior shape of the press vessel. It is necessary for the seal to very tightly conform to the interior shape of the vessel so that fines are blocked by the seal from passing into the drinkable beverage. To achieve this, the interior walls of a press vessel are straight in the vertical dimension and the seal is made of a fixed size that is complementary to the interior cross-sectional shape of the vessel (in the horizontal plane), in snug contact with the walls.

The fixed size seal and straight wall container arrangement of the prior art is disadvantageous, among other reasons, in that it limits the variety of shapes and sizes in which press vessels may be made—both for functional and aesthetic reasons. It also limits the number and type of vessels with which a given plunger may be used. A need thus exists for a beverage press that may be made in other than a straight sided and/or vertically sided configuration. A need also exists for a plunger arrangement that can be used effectively in vessels of different shapes and size.

The fixed size seal and straight wall arrangement of the prior art is also disadvantageous because, for example, if the vessel is bent or broken, a user must find a container of exactly the same size to have a functional press. If the particular press product line has been discontinued or is no longer available commercially, the plunger and other press parts are useless (they do not achieve a sufficiently tight seal with an alternate vessel), and a user must purchase an entirely new press—an expensive and undesirably consumptive use of resources.

Another disadvantageous aspect of prior art beverage presses relates to brew or seep control. Once pressed, i.e., once the plunger has been pushed into the position that separates the fines from the infused liquid, there is still contact through the strainer between the fines and the liquid. This contact leads to continued diffusion of coffee, tea or other particles into the beverage, and thereby potential over-brewing. A need exists for reducing brewing action in a press when a desired state of brewing has been or has nearly been reached.

Yet another disadvantageous aspect of prior art beverage presses is that they tend to have lids that completely seal or block access to the interior of the vessel. If a user wants to add milk, sweetener, flavor, nutritional supplements or other substances, the user must remove the lid which in turn moves the plunger and stirs up fines previously filtered out by the plunger. A need exists for a lid configuration that permits adding substances to the liquid inside a beverage press vessel without disturbing the fines, plunger and/or lid position, etc.

SUMMARY OF THE INVENTION

Accordingly, it is an object of the present invention to overcome one or more of the above-mentioned or other shortcomings of the prior art.

It is another object of the present invention to provide a press plunger arrangement that may be used with differently shaped and sized vessels.

It is another an object of the present invention to provide a press plunger arrangement that may be used with vessels that have an interior shape (in the horizontal plane) that changes along the vertical dimension of the vessel.

It is yet another object of the present invention to provide brew control and/or access to a brewed beverage in a beverage press.

These and related objects of the present invention are achieved by use of a plunger and lid apparatuses for a beverage press and a beverage press having same as described herein.

In one embodiment, among others, the present invention may includes a lid, a shaft movably provided through that lid, a screen provided proximate one end of the shaft for filtering fines from an infused beverage, and a flexible seal structure disposed outwardly of the screen. The seal structure may have a perimeter that defines a first area in a substantially horizontal plane when at rest and is compressible to define a second area in the same plane when compressed in a beverage press vessel. The second area may be smaller by 5%, 10%, 15% or more than the first area.

The seal structure may include a flexible seal member formed of a natural or synthetic rubber or rubberized plastic or the like. The seal member may have a width that is at least two times greater than its thickness, and may be three, five or more times its thickness.

Other inventive aspects include, but are not limited to, a seal structure that ascend, descends and/or is flared; or one that viewed from above is substantially non-circular.

The present invention also includes a brew control device that is actionable by a user to substantially cover the screen. The brew control device may be actionable through the lid.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIGS. 1 and 2 are a top perspective view and a side elevation view of a plunger device and lid assembly for use with a beverage press in accordance with the present invention.

FIG. 3 is a top perspective view of the device of FIGS. 1 and 2 with the brew control member released.

FIGS. 4-6 are three cross-sectional side views that illustrate the plunger and lid arrangement of FIGS. 1-3 with three differently shaped beverage press vessels.

FIG. 7 illustrates a cross-sectional side view of the strainer and seal components of the plunger device of FIG. 1.

FIG. 8 is a top view of the device of FIG. 7 without the seal and in accordance with the present invention.

FIG. 9 is a side view illustrating different positions or configurations of the seal of FIGS. 1 and 7 in accordance with the present invention.

DETAILED DESCRIPTION

Figure 10A:
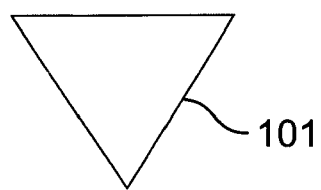
FIGS. 10A and 11 are top plan views of two beverage press vessels in accordance with the present invention.

Referring to FIGS. 1 and 2, a top perspective view and a side elevation view of a plunger device 10 and lid assembly 50 for use with a beverage press in accordance with the present invention are shown.

Plunger device 10 may include a shaft 11 having a handle or knob 12 at one end and a strainer 14 and seal 20 at the other end. Suitable handles and/or knobs are known in the art. The strainer and seal end of shaft 11 preferably has a frame or like structure 15 that provides support for a straining or filtering mesh 16. Frame 15 may include a first frame member 18 (shown in FIG. 2) and a second frame member 19 between which mesh 16 is secured. The frame may be made of metal or plastic or other suitable materials. The mesh is preferably made of stainless steel, but may be made of any suitable material. In FIG. 1, a portion of frame 15 is removed to show mesh 16. The frame and related components are discussed in more detail below with reference to FIGS. 7-8.

Seal 20, in the embodiment of FIGS. 1 and 2, is made of a flexible, yet resilient material that is stretched around frame 15 until the base 22 of the seal lodges in a recess 17 defined in frame 15 (illustrated with more detail in FIGS. 7-8). Seal 20 is preferably made of a material and in a shape that can be compressed and/or otherwise moved to accommodate different sized containers. In FIG. 1, seal 20 is a flared O-ring made of a food safe silicone. Other suitable materials may include food safe rubber, some plastics, foam and other food safe materials that are suitably compressible and resilient. The similar function (a seal or strainer configuration that works effectively with a range of horizontally disposed interior dimensions) could be achieved using other structures and materials, e.g., movable wall sections and/or frame members, biased members, flexible mesh, etc., without departing from the present invention.

FIG. 2 illustrates that frame 15 may be secured to shaft 11 with a bolt 8 or another suitable fastening mechanism. Several suitable fastening mechanisms are known in the art.

Lid assembly 50 may include a lid 52, drink and air holes 54, 55, a cover or covers for these holes, and a brew control mechanism 70, among other features. Lid 52 may have a main cover section 57 and a side wall section 58. The main section may be tilted and drink hole 54 provided at the lowest point so that any liquid on the lid drains toward the drink hole. Lid 52 may include a lip 56 and a side wall mounted flexible seal member 59 to reduce accidental spill. The lip and seal member arrangements are known in the art.

FIG. 1 illustrates that main cover section 57 has a recessed region 61 in which is provided a slidable cover 62 for drink and air holes 54, 55. The slidable cover 62 may include movement control tabs 64, 65, a slot 9 for shaft 11, and an air hole opening 67. When the lid is in the closed position, cover 62 covers drink hole 54 and air hole 55. When the lid is in the open position, drink hole 54 is exposed and air hole 55 is aligned with the air hole opening 67 in cover 62. Slidable cover 62 snaps into the complementary shaped recessed region 61 or is otherwise movably coupled to lid 52.

FIG. 2 illustrates aspects of the bottom of lid 52, recessed region 61, and the tilt of region 61 towards drink hole 54. FIG. 2 also illustrates the brew control mechanism 70 that may include a brew control member 71 and release latch 72 that affects release of that control member. The release latch is preferably actionable through lid 52.

In one embodiment, control member 71 is disk or "washer" shaped and slidably provided about shaft 11. Release latch 72 includes a lip 73 that descends under and engages member 71, retaining member 71 within the lid assembly until release. Latch 72 is coupled through a slot in lid 52 to lid cover 62. In one embodiment of the present invention, the brew control member may function as follows. When the lid cover is slid back to open the drink and air holes (for example, after brewing and straining), latch 72 is also moved back (to the left in the arrangement of FIG. 2), moving latch lip 73 out of engagement with brew control member 71 and permitting brew control member 71 to fall down shaft 11 (in the direction of arrow A) and cover mesh 16 as shown in FIG. 3. This effectively blocks or significantly reduces contact between the infused liquid and the beverage fines and thereby stops brewing.

FIG. 3 illustrates the device of FIGS. 1 and 2 with the brew control member 71 released such that in covers mesh 16, effectively sealing the fines away from the infused beverage. Arrow B indicates the movement of plunger 10 through lid 40.

While movement of latch 72 is dependent upon movement of cover 62 in the embodiment of FIG. 2, latch 72 may also be fabricated for movement independent of cover 62. For example, by providing a release knob through lid 52, in much the same way that shaft 11 runs through the lid (and opening covers), a user can release brew control member 71 independent of movement of lid 61. In this manner, a user can open the drink and air holes, and test taste a beverage for a desired state of brewing before releasing the brew control member.

Referring to FIGS. 4-6, three cross-sectional side views are presented that illustrates the plunger and lid arrangement of FIGS. 1-3 with three differently shaped press vessels. FIG. 4 illustrates a press vessel 81 in which the walls 85 are vertically and linearly disposed. Plunger 10 and seal 20 move vertically up and down vessel 81 without flexible seal 20 changing appreciably in shape.

FIG. 5 illustrates a vessel 82 in which the interior walls include three sections 86-88 of differing diameters. A vessel of this shape might be used in cooperation with a car cup holder or the like. Seal 20 is constricted in diameter as it moves from the top section to the middle section.

FIG. 6 illustrates a vessel 83 with tapered walls 89 that descend in diameter from the top towards the bottom, for example, a common configuration for tumblers, etc. As plunger 10 is pushed downward to separate fines, the outer diameter of seal 20 is reduced as it is compressed by the narrowing walls. This permits a straining of fines out of an infused liquid even though the walls of the vessel change in shape, i.e., narrow, from top to bottom. After brewing and fine separation, the brew control member may be released to stop brewing.

FIG. 6 illustrates bottom, mid-span and top dimensions X-Z. If for example, Z=3" and Y=2.75", then the cross sectional area defined by the perimeter of seal 20 is reduced from 7.07 sq. in. at Z to 5.94 sq. in. at Y, a reduction of approximately 16%. If Z=3" and Y=2.85", then the reduction is to 6.38 sq. in. or 9% and if Y is 2.65" then the reduction is to 5.52" sq. in. or 22%. Thus, the area defined by the perimeter of seal 20 may be compressed such that the area defined by the compressed perimeter is 5, 10, 15, 20 or more percent less than in its uncompressed state.

FIG. 7 illustrates a cross-sectional side view of strainer 14 and seal 20 of FIG. 1. Frame member 18 includes a horizontally disposed support member 26 and a vertically ascending circumferentially disposed support member 27. Brew control member 71 fits inside of vertical support member 27. Recess 17 is formed on the exterior surface of vertical support member 27 and seal 20 is mounted to frame 15 by way of this recess. Member 26 is not shown in FIG. 1 (though member 27 is) so that mesh 16 is not obscured. A top plan view of member 26 is shown in FIG. 8.

Fastener 28 may be coupled to shaft 11 with frame 15 secured between this fastener and fastener 8. Mesh 16 is preferably secured within frame 15, between frame members 18,19.

Referring to FIG. 8, a top plan view of the device of FIG. 7 without seal 20 (thus emphasizing the frame and screen) is shown. Horizontal support member 26 may include a central recess 31 for fastener 28 and a plurality of large and small openings 32,33 which define a support framework 35 that is coupled to vertical support member 27. Bottom frame member 19 preferably has the same opening arrangement (32, 33) as top member 18, and the openings in the top and bottom frame members 18, 19 are aligned for passage of the infused liquid. Mesh 16 is visible from top or bottom through opening 32, 33. While FIGS. 7-8 illustrate one embodiment of a strainer and frame, it should be recognized that other strainer and frame embodiments may be used without departing from the present invention.

Referring to FIG. 9, a side view illustrating different positions of the same seal 20 emanating from frame members 18, 19 in accordance with the present invention is shown. FIG. 9 illustrates 3 (of the infinitely many) positions. Position 91 represents seal 20 at rest. It may be used with a vessel having a maximum diameter that is equal to or slightly less than this maximum diameter, $D_{max}$. Position 93 represents seal 20 constricted to its minimum or near minimum diameter, $D_{min}$. The seal cannot readily pass through a vessel or a region of a vessel having a diameter less than $D_{min}$. Position 92 represents an intermediate diameter between positions 91 and 93, $D_{int}$.

As discussed with reference to FIG. 6, the Dmin or Dint may define an area 5 to 10 or more percent less than Dmax. If, for example, Dmax is 3" and Dmin is 2" then the respective areas are 7.07 sq. in. and 3.14 sq. in., a 56% reduction.

Figure 10B:
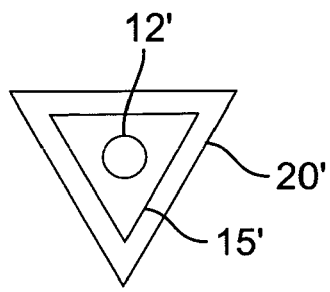
FIG. 10B is a top plan view of a plunger and seal arrangement for the vessel of FIG. 10A.
Figure 11:
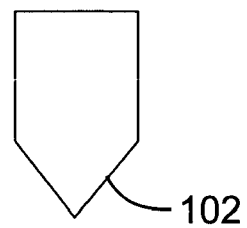

FIGS. 10A and 11 are top plan views (in horizontal cross-section) of two beverage press vessels 101, 102 in accordance with the present invention. FIG. 10B is a top plan view of a plunger and seal arrangement for vessel 101 of FIG. 10A. FIGS. 10A-10B illustrate that a beverage vessel in accordance with the present invention may have a triangular frame 15' and seal 20' (like frame 15 and seal 20, but triangular). Silicone or the like materials permit the formation of a seal in many different configurations, including configurations with corners, such as those necessary to form a functional seal with the triangular shape vessel 101. A handle 12', similar to handle 12 discussed above, is shown while a lid, such as lid 40 of FIG. 3-6, yet triangular, is not shown so that the frame and seal are visible.

FIG. 11 illustrates a similar vessel 102, yet with a pentagonal configuration.

Figure 12:
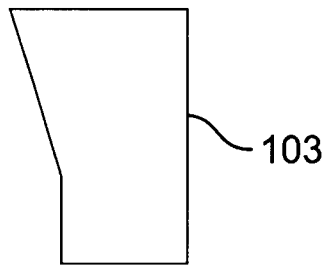
FIGS. 12-13 are respectively side elevation views of a beverage press vessel and a plunger and seal arrangement therefor in accordance with the present invention.

FIG. 12 is a side elevation view of a beverage press vessel 103 in accordance with the present invention that has a larger horizontal cross-sectional area toward the top of the vessel than at the bottom, such as in some pitchers.

Figure 13:
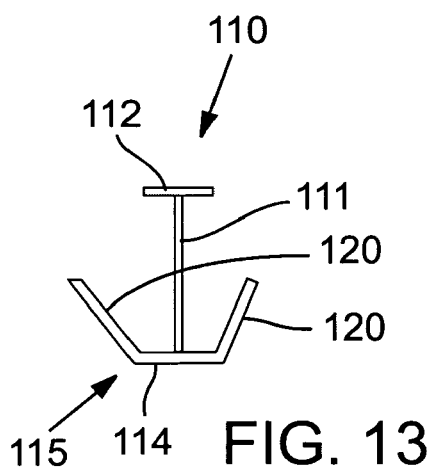

FIG. 13 is a side view of a plunger device 110 for the beverage press vessel 103 of FIG. 12. Plunger device 110 may include a shaft 111, a handle 112, a strainer 114, a frame 115 and a seal 120, similar to their corresponding components in FIGS. 1-3, except for their configuration. The flexible seal 120 accommodates the changes in the interior shape of vessel 103 and permits adequate separation of fines and use of vessel 103 in a beverage press.

Figure 14:
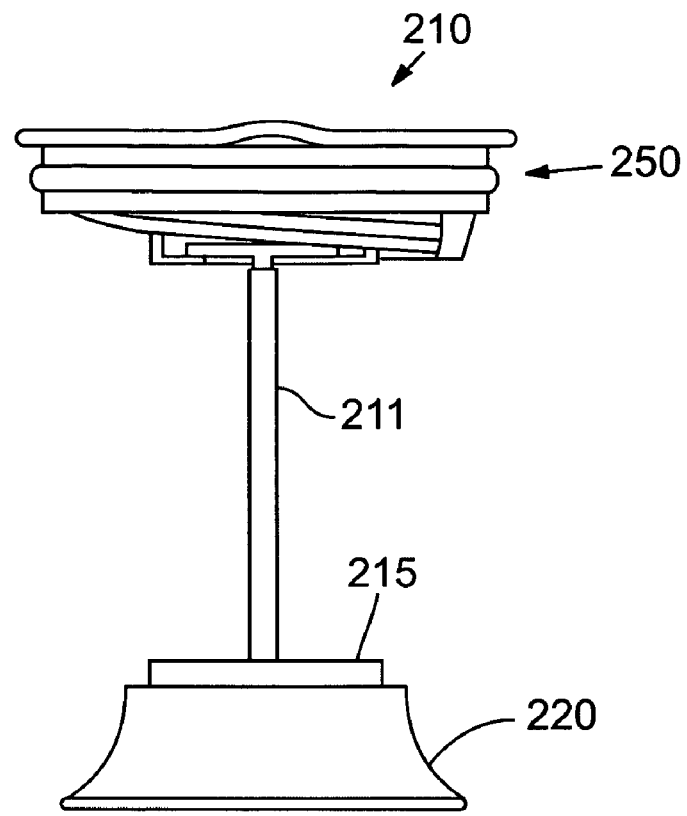
FIGS. 14-15 are side elevation views of another embodiment of a seal arrangement in accordance with the present invention.

Referring to FIG. 14, a side elevation view of another embodiment of a plunger device 210 and lid assembly 250 for use with a beverage press in accordance with the present invention is shown. FIG. 14 illustrates a seal 220 that is provided substantially upside down relative to the seal of plunger device 10 of FIG. 2. Seal 220, which may be made of silicone or another appropriate material, descends in the rested position and may move for example as shown in FIG. 15.

FIG. 14 also illustrates a lid arrangement 250 (which may or may not include brew control) and a shaft 211. While brew control is taught with reference to FIG. 1-3 and illustrated in FIG. 14, it should be recognized that it may be excluded without departing from the present invention.

Figure 15:
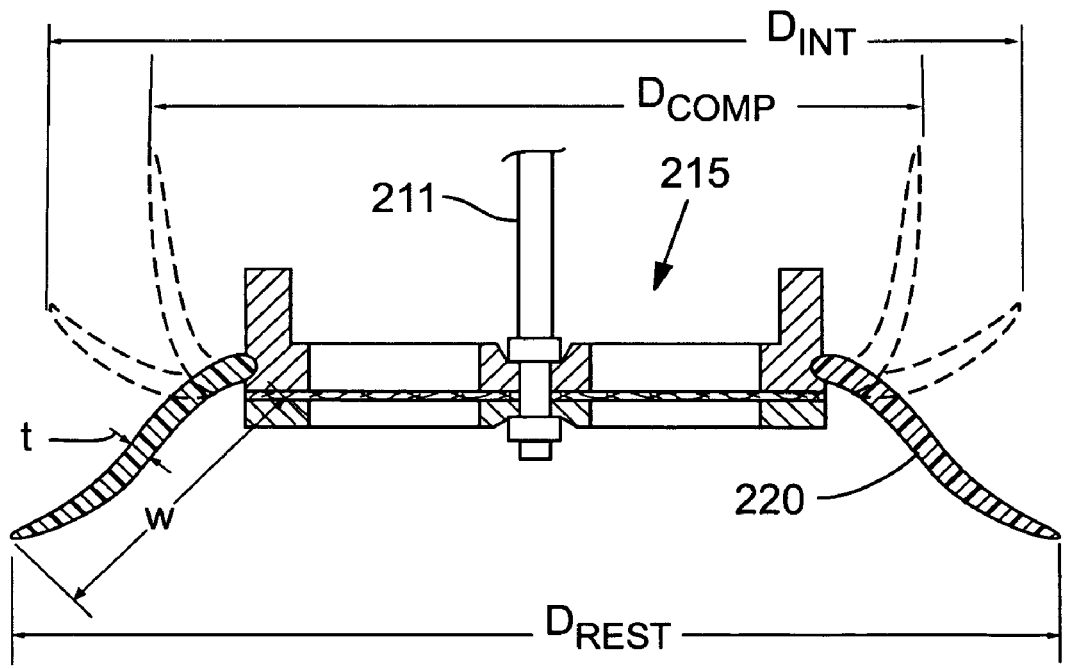

FIG. 15 illustrates that seal 220 is preferably coupled to frame 215 which is in turn coupled to shaft 211 (similar to the coupling configuration of device 10 of FIG. 2). Seal 220 may move from an at-rest position having a rest diameter, Drest, through in intermediate diameter, Dint, to a more compressed diameter, Dcomp, that may be realized as the seal is pressed against narrowing side walls such as is the case with vessels 82,83 of FIGS. 5-6. For example, the vessels in those figures may narrow from 3" to 2" of from 4" to 2.5" or 3", among other dimensions.

FIGS. 7 and 15 also illustrate that the seal 20, 220 (120) may have a thickness, t, and a width or length, w. The width is greater than the length. The width may be 2 or 3 times the thickness, or in other embodiments may be from 5, to 10, to 15 or more times greater, depending for example on the desired configuration of the seal and/or vessel, the strength and flexibility of the seal material, and/or other factors.

Referring generally to the present invention, it should be recognized that the configurations of the vessels of FIGS. 4-6 and 10-12 are merely illustrative, and not exhaustive, of the range of shapes and sizes of vessels (and plunger devices and lid devices) that may be provided in accordance with the present invention. It should also be recognized that vessels (and corresponding plunger and lid components) may be elliptical, hexagonal, amorphous, other polygonal, or otherwise shaped, and they may extend upward, downward or primarily laterally, etc.

With respect to materials, materials for standard beverage presses components are generally known in the art. They may include food safe plastic, metal, rubber, wood, or other material(s).

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A plunger device for a beverage press, comprising:
   a lid;
   a shaft movably provided through said lid;
   a substantially planarly disposed screen provided proximate one end of said shaft for filtering fines from an infused beverage;
   a flexible seal structure disposed outwardly of said screen, a perimeter of said seal structure defining a first area in a substantially horizontal plane when at rest and being compressible to define a second area in a substantially horizontal plane when compressed in a beverage press vessel that is smaller by 20% or more than said first area, the seal being configured so that the perimeter when compressed into the second area maintains a functional seal; and
   wherein the seal member ascends from and extends in a substantially linear or outwardly tapering manner, in vertical cross-section, from the planarly disposed screen
   wherein said seal structure is comprised of a seal member made of a flexible material that is inherently self biased towards a position defining said first area;
   wherein said flexible seal member extends from a fixed support structure therefor by a distance that is at least substantially three times the thickness of the flexible seal member at the fixed support structure; and
   further comprising a releasable brew control device having a substantially continuous closed surface that is actionable by a user to substantially cover said screen;
   wherein said brew control is actionable through said lid and descends the shaft into a position that covers the screen, thereby blocking fines from the infused beverage.

2. The device of claim 1, wherein said seal member is comprised of natural or synthetic rubber.

3. The device of claim 1, wherein said seal structure as viewed from above is substantially non-circular.

4. A plunger device for a beverage press, comprising;
   a lid;
   a shaft movably provided through said lid;
   a screen provided proximate one end of said shaft for filtering fines from an infused beverage;
   a frame supporting said screen;
   a flexible seal structure disposed outwardly of said frame; and
   a brew control device substantially planar in shape and having a substantially continuous closed surface that is actionable by a user to substantially cover said screen, and thereby reduce contact between fines excluded from an infused beverage and the remaining beverage;
   wherein said brew control is actionable through said lid; and
   wherein said seal structure includes a seal member that is formed of a natural or synthetic rubber and is disposed outwardly of said screen, said seal member having a width that is at least three times greater than its thickness.

5. The device of claim 4, wherein said seal structure is flared in vertical cross-section.

* * * * *